United States Patent [19]

Sutrina et al.

[11] Patent Number: 4,734,626
[45] Date of Patent: Mar. 29, 1988

[54] DOUBLE DIFFERENTIAL, ELECTRICALLY COMPENSATED CONSTANT SPEED DRIVE

[75] Inventors: Thomas Sutrina, Rockford; Bryan W. Dishner, Roscoe, both of Ill.

[73] Assignee: Sundstrand Corporation, Rockford, Ill.

[21] Appl. No.: 945,869

[22] Filed: Dec. 23, 1986

[51] Int. Cl.$^4$ .................. H02P 1/16; H02P 15/00
[52] U.S. Cl. .................. 318/76; 318/149; 318/12; 290/4 R; 322/40; 322/12; 307/84; 307/87
[58] Field of Search .................. 318/76, 146, 147, 153, 318/157, 38, 12; 290/4 R, 4 C, 40 R; 322/14, 16, 25, 28, 29, 40; 363/41, 97, 98, 124; 323/267, 266; 307/87, 84

[56] References Cited

U.S. PATENT DOCUMENTS

| | | | |
|---|---|---|---|
| 2,735,059 | 2/1956 | Schaelchlin | 318/76 X |
| 3,468,193 | 9/1969 | O'Mahony | 74/686 |
| 3,953,775 | 4/1976 | Friend et al. | 318/157 X |
| 4,354,144 | 10/1982 | McCarthy | 318/76 X |
| 4,354,400 | 10/1982 | Baker | 74/687 |
| 4,525,661 | 6/1985 | Mucsy et al. | 322/40 X |
| 4,572,961 | 2/1986 | Borger | 322/40 X |
| 4,661,762 | 4/1987 | Baker | 307/87 X |

OTHER PUBLICATIONS

Oil Hydraulic Power Transmission and Control, "A Double-Differential, Hydrostatic Constant-Speed Alternator Drive" by R. Westbury, Paper No. 5, Nov. 29 and 30, 1961.

Primary Examiner—William M. Shoop, Jr.
Assistant Examiner—Paul Ip
Attorney, Agent, or Firm—Wood, Dalton, Phillips, Mason & Rowe

[57] ABSTRACT

An electrically compensated constant speed drive (ECCSD) according to the present invention includes a pair of power transmission paths between the prime mover and a load wherein each power transmission path includes a mechanical differential having a first input coupled to the output of the prime mover and an output coupled to the load. A second input of each of the differentials is coupled to a permanent magnet machine and a power converter interconnects the electrical power windings of the permanent magnet machines. In operation, one of the permanent magnet machines is always operated as a generator while the other permanent magnet is operated as a motor so that power flow through the power converter is unidirectional. The ECCSD of the present invention results in a substantial reduction in the maximum control power and hence efficiency is increased and complexity is reduced.

13 Claims, 8 Drawing Figures

DOUBLE DIFFERENTIAL, ELECTRICALLY COMPENSATED CONSTANT SPEED DRIVE

DESCRIPTION

1. Technical Field

The present invention relates generally to power converters, and more particularly to a constant speed drive for converting variable speed motive power into constant speed motive power for driving a load.

2. Background

Constant speed drives (CSD's) are typically coupled between a variable speed prime mover and a generator so that the generator develops constant frequency power even with changes in prime mover speed. Known CSD's are of the hydromechanical type which have been found to encounter difficulties in certain applications. For example, when such CSD's are used in aircraft, it has been found that the drives are sensitive to aircraft attitude changes and that maintenance intervals are shorter than desired.

Electrically compensated CSD's (ECCSD's) have been proposed for use in applications where conventional CSD's have been found to be inadequate. One type of ECCSD includes a mechanical differential speed summer having a first input shaft coupled to the output shaft of the prime mover, a second input shaft and an output shaft at which the constant speed motive power is developed. A speed compensation link is coupled to the second input shaft of the speed summer and includes a first or speed-compensating permanent magnet machine having a motive power shaft coupled to the second input of the differential speed summer and electrical power windings. A motive power shaft of a second or control permanent magnet machine is coupled to the output shaft of the prime mover. Electrical power is transferred between the windings of the first permanent magnet machine and electrical power windings of the second permanent magnet machine by either a DC link inverter or a cycloconverter so that the compensating permanent magnet machine develops compensating speed of a magnitude and direction which causes the output of the differential to be driven at the desired constant speed.

The DC link inverter for controlling the flow of power between the windings of the permanent magnet machines has been found to cause excessive current flow in one of the machines at certain operating speeds. The cycloconverter was initially thought to be capable of superior performance as compared to the DC link inverter; however, this type of power converter is also subject to numerous operating difficulties. Chief among these is that the cycloconverter presents a low power factor load to the permanent magnet machines, in turn requiring unduly large and heavy machines. Also, at low speeds the cycloconverter can cause generation of pulsating torque at frequencies which are sufficiently low to permit response thereto by the mechanical components in the system. Further, at low operating speeds the permanent magnet machines do not produce enough voltage to permit natural commutation of SCR's in the cycloconverter.

A further type of ECCSD is disclosed in Dishner et al U.S. application Ser. No. 893,943, filed Aug. 6, 1986, entitled "Power Converter for an Electrically Compensated Constant Speed Drive" and assigned to the assignee of the instant application. This power converter overcomes the disadvantages of the ECCSD's described above by utilizing a bi-directional power converter which interconnects the electrical power windings of the permanent magnet machines. The power converter includes a first bi-directional AC/DC converter coupled to the electrical power windings of one of the permanent magnet machines, a second bi-directional AC/DC converter coupled to the electrical power windings of the other of the permanent magnet machines and a bi-directional DC/DC converter coupled between the AC/DC converters. A control is included for controlling the AC/DC converters and the DC/DC converter whereby electrical power is transferred between the permanent magnet machines so that the speed-compensating permanent magnet machine develops compensating speed of a magnitude and direction sufficient to maintain the speed summer output shaft at the desired speed.

While the electrically compensated constant speed drive disclosed in the above-identified Dishner et al patent application overcomes the difficulties encountered with prior CSD's, the drive utilizes a single transmission path between the prime mover and the generator. The differential must therefore be capable of adding or subtracting relatively large amounts of control power. It can be shown that the overall efficiency of the drive is directly related to the amount of control or trim power which is handled by the differential, and hence the power compensation effected by the differential is limited to bring the efficiency of the drive within acceptable limits. This typically means that appropriate gearing must be provided between the prime mover and the differential so that the differential is operated in an operating band which includes a condition known as "straight-through", at which point substantially no power is added or subtracted by the differential. One consequence of operating in this band is that the power converter must be capable of bi-directional power flow. Also, the control must be capable of controlling the power converters in a plurality of operational modes wherein the permanent magnet machines are operated as either a motor or a generator depending upon the output speed of the prime mover. Both of these requirements render the control for the power converter unduly complex. Further, there are times when the speed-compensating permanent magnet machine must be operated as a generator at low speeds to subtract power. Permanent magnet machines, however, cannot generate power well at low speeds. Hydrostatic power units operate very well under such conditions, but are subject to the other disadvantages noted above.

SUMMARY OF THE INVENTION

In accordance with the present invention, an electrically compensated constant speed drive includes two mechanical power transmission paths which together require less maximum control power than the single transmission path disclosed in the above-identified Dishner et al application so that greater efficiency is achieved. Also, the straight-through condition is avoided so that the power converter may be simplified.

More specifically, the constant speed drive of the present invention includes first and second differentials each having first and second inputs and an output, the differential outputs being coupled together and producing constant speed motive power for driving a load. The first inputs of the differentials are coupled through a gear set or gear box to the output of a prime mover, the gear set being arranged so that the first input of the first differential is driven at a speed greater than a desired output speed of the drive and the first input of the second differential is driven at a speed less than the desired output speed. A first permanent magnet machine includes a motive power shaft which is coupled to the second input of the first differential, such machine being driven as a generator to develop alternating current power at power windings thereof. A second permanent magnet machine includes a motive power shaft coupled to the second input of the second differential, the second permanent magnet machine also including electrical power windings. A power converter interconnects the power windings of the first and second permanent magnet machines to operate the second permanent magnet machine as a motor so that compensating speed of appropriate magnitude is developed to cause the outputs of the differentials to develop motive power at the desired speed.

In the instant invention, power flow always is in one direction from the first differential to the second differential, and hence the power converter need not be of bidirectional nature. Also, the first permanent magnet machine is always operated as a generator while the second permanent magnet machine is always operated as a motor. Thus, the design of the power converter and the control circuits therefor can be greatly simplified.

In reality, the drive of the present invention comprises a servo control loop which operates at the minimum control power required to maintain the output speed at a desired value.

BEST MODE FOR CARRYING OUT THE INVENTION

Figure 1:
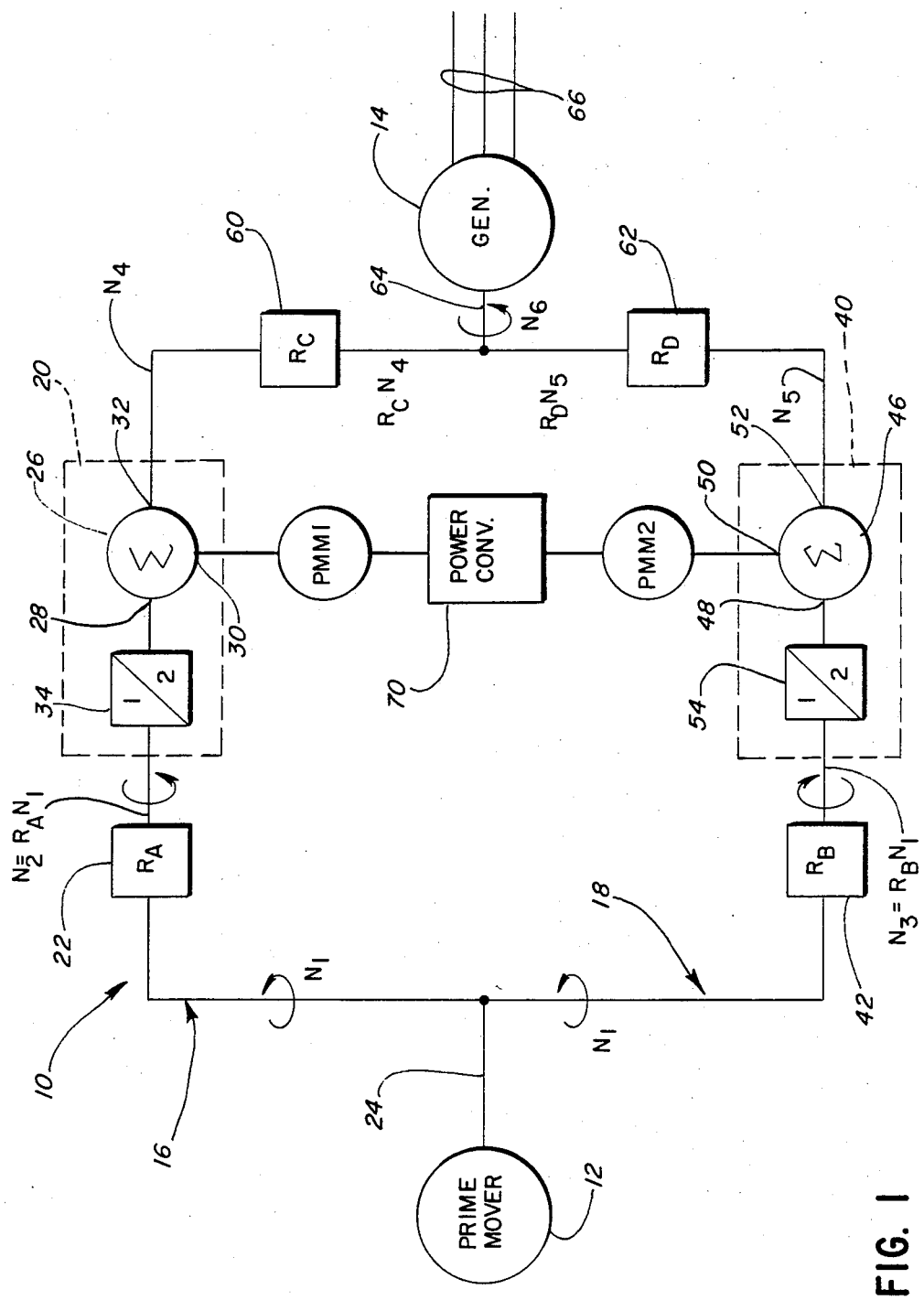
FIG. 1 is a block diagram of the electrically compensated constant speed drive according to the present invention.

Referring now to FIG. 1, there is illustrated a double differential ECCSD 10 according to the present invention. The ECCSD 10 receives variable speed motive power from a prime mover 12 and converts the variable speed motive power into constant speed motive power for driving a load, such as a generator 14 so that it produces constant frequency AC power. The ECCSD 10 includes first and second power transmission paths 16, 18 which are coupled between the prime mover 12 and the generator 14. The first power transmission path includes a first differential 20 which is coupled by a gear box or set 22 to an output shaft 24 of the prime mover 12. The differential includes a speed summer 26 having first and second inputs 28, 30 and an output 32. The differential 20 effects a 2:1 speed increase which is represented by a box 34.

In similar fashion, the second power transmission path includes a second differential 40 which is coupled by a gear box or set 42 to the shaft 24. The differential 40 includes a speed summer 46 having first and second inputs 48, 50 and an output 52. Again, the differential 40 effects a 2:1 speed increase as represented by the box 54.

The output shafts 32, 52 of the differentials 20, 40 are coupled through separate or integral gear boxes or sets 60, 62, respectively, to a common output shaft 64. The shaft 64 is in turn coupled to the generator 14 and is driven at a constant desired output speed so that the generator 14 develops constant frequency AC power on a series of conductors 66 coupled to the armature windings (not shown) of the generator 14.

The second input of the speed summer 26 is coupled to a motive power shaft of a first permanent magnet machine PMM1. The second input shaft of the speed summer 46 of the differential 40 is coupled to a motive power shaft of a second permanent magnet machine PPM2. Electrical power windings of the machines PMM1 and PMM2 are interconnected by a power converter 70 which manages the flow of power between the machines to keep the output speed of the shaft 64 constant.

The gear boxes 22, 42 are speed multipliers having speed ratios of $R_A$ and $R_B$, respectively. That is, if $N_1$ is the speed of the shaft 24, the output speed $N_2$ of the gear box 22 is equal to $R_A N_1$, while the output speed $N_3$ of the gear box 42 is equal to $R_B N_1$. The speed ratios $R_A$ and $R_B$ are selected so that the speed $N_2$ is always greater than the output speed $N_4$ of the output shaft for all expected operating speeds of the prime mover 12. Hence the first differential 20 always operates above straight-through. However, the speed ratio $R_B$ of the gear box 42 is selected so that the speed $N_3$ is always less than the output speed $N_5$ of the output shaft 52 of the differential 40. Thus, the second differential 40 always operates below straight-through. The speeds $N_4$ and $N_5$ are multiplied by gear boxes 60, 62 having speed ratios $R_C$ and $R_D$, respectively, to develop the constant output speed $N_6$ of the output shaft 64.

While the pairs of gear boxes 22, 42 and 60, 62 are illustrated as separate structures, it should be noted that each pair may in fact comprise a single gear set or structure, if desired.

Since both of the speeds $N_4$ and $N_5$ are constant, it is necessary for the PMM1 to subtract power from the differential 20 and for the PMM2 to add power to the differential 40. Therefore, the permanent magnet machine PMM1 must be operated as a generator to supply electrical power through the power converter 70 to the PMM2 to operate it as a motor. One result of this unidirectional power flow is that the design of the power converter 70 may be relatively simple.

Figure 2:
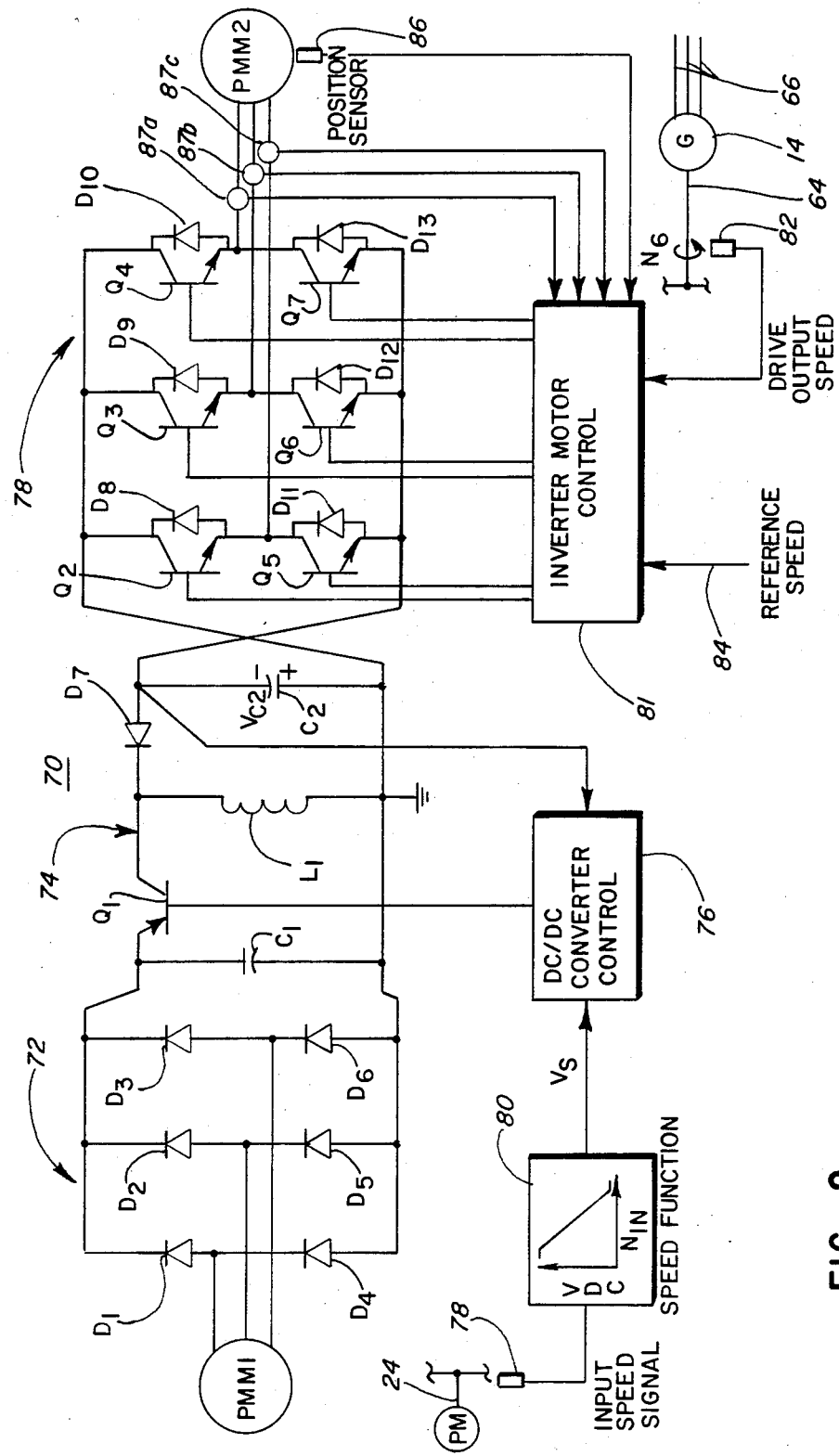
FIG. 2 is a combined schematic and block diagram of a preferred embodiment of a power converter for interconnecting the electrical power windings of the permanent magnet machines shown in FIG. 1.

Referring now to FIG. 2, there is illustrated the power converter 70 in combined schematic and block diagram form. The converter includes a rectifier circuit comprising a full wave rectifier bridge 72 having diodes $D_1-D_6$ coupled to the electrical power windings of the PMM1. The rectifier circuit 72 rectifies the AC output of the PMM1 to derive intermediate DC power. A buck/boost DC/DC converter 74 is coupled across the outputs of the rectifier 72. The converter 74 boosts or bucks the intermediate DC power output of the rectifier 72 is dependence upon the speed of the prime mover output shaft 24. This operation is effected by a converter control 76 which is responsive to a speed signal developed by speed sensor 78 and a speed function generator circuit 80. As noted in greater detail hereinafter, the DC/DC converter 74 boosts the output of the rectifier 72 when the speed of the PMM1 is low and reduces the output voltage of the rectifier 72 when the speed of the PMM1 is high. This operation is achieved by suitable control of a transistor Q1 which controls the transfer of power between a capacitor C1 and energy storage elements $L_1$ and $C_2$ which are coupled in series with a diode $D_7$.

If necessary or desirable, an inductor (not shown) may be coupled between the rectifier 72 and the capacitor C1.

The output voltage $V_{C2}$ of the DC/DC converter 74 across the capacitor $C_2$ is coupled to a full bridge inverter comprising transistors $Q_2-Q_7$ together with flyback diodes $D_8-D_{13}$. The switches $Q_2-Q_7$ are operated by an inverter motor control 81, described in greater detail hereinafter. At this point, it suffices to say that the control 81 is responsive to a speed error signal which is developed by subtracting a signal representing the speed $N_6$ of the output shaft 64 as developed by a speed sensor 82 from a reference speed signal developed on a line 84. The control 81 is also responsive to a rotor position signal developed by a position sensor 86 which detects the position of the rotor of the PMM2 and a series of current sensors 87a-87c which develop signals representing the current in the armature windings of the PMM2.

Figure 3:
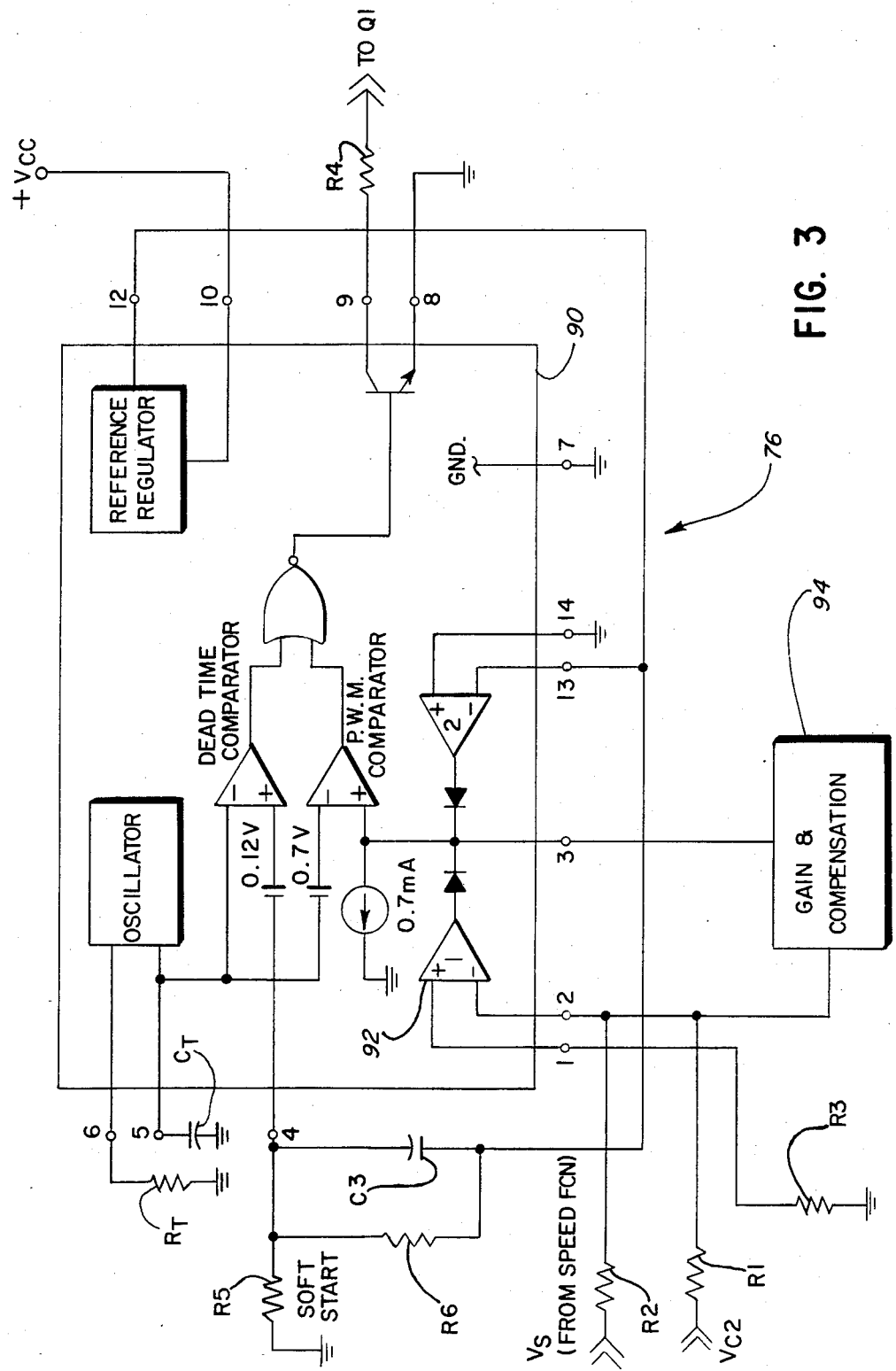
FIG. 3 is a combined schematic and block diagram of the DC/DC converter control circuit for operating the switch Q1 of the DC/DC converter shown in FIG. 2.

Referring now to FIG. 3, the DC/DC converter control 76 is implemented in part by a Motorola MC35060 integrated circuit (IC) 90 which, together with external circuitry shown in the figure, comprises a PWM modulator. The integrated circuit 90 is coupled to the external circuitry at pins identified by numbers immediately outside of the box depicting the integrated circuit. The voltage $V_{C2}$ across the capacitor $C_2$ is coupled through a resistor R1 to a pin 2 of the IC 90. This pin is in turn coupled to an inverting input of an internal error amplifier 92. A reference signal $V_S$ developed by the speed function generator circuit 80 illustrated in FIG. 2 is coupled through a resistor R2 to the pin 2 of the IC 90. A noninverting input of the operational amplifier 92 is coupled through a resistor R3 to ground potential.

The error amplifier 92 develops an error signal representing the deviation of the DC output $V_{C2}$ from the reference $V_S$. The integrated circuit 90 develops a pulsewidth modulated or PWM waveform at a pin 9 which is coupled through a resistor R4 to the base of the transistor Q1. The duty cycle of the PWM waveform is determined by the magnitude of the error signal developed by the error amplifier 92. If necessary or desirable, the output appearing at the pin 9 may be amplified before it is applied to the base of the transistor Q1.

A gain and compensation circuit 94 may be coupled to the inputs 2 and 3 to insure stable operation of the converter 74.

A soft-start function may be implemented by connecting resistors R5 and R6 and a capacitor $C_3$ to pin numbers 4, 13 and 12 of the integrated circuit 90.

Figure 4:
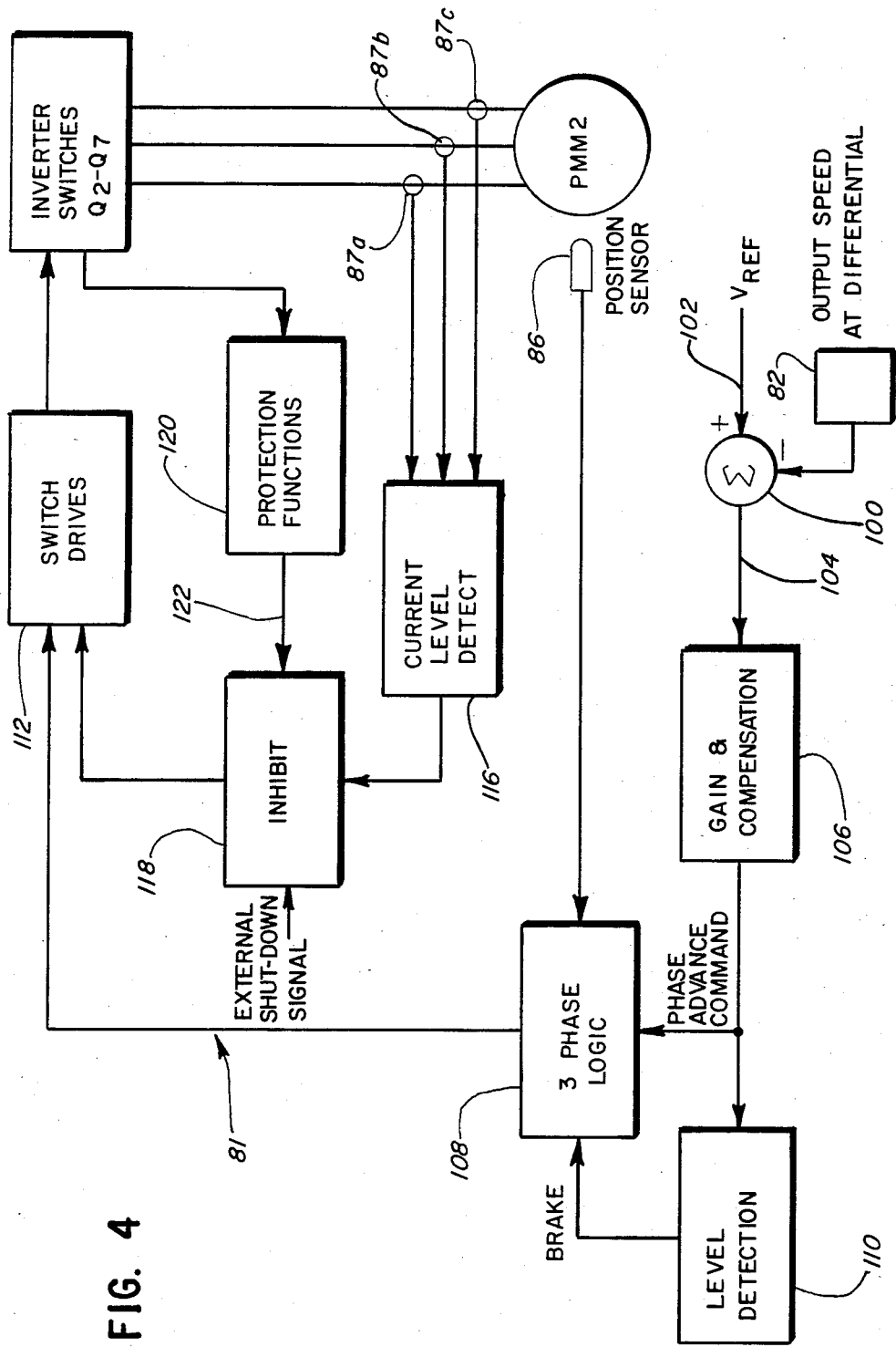
FIG. 4 is a block diagram of the motor inverter control circuit for operating the inverter shown in FIG. 2.

Referring now to FIG. 4, there is illustrated in greater detail the motor inverter control circuit 81 shown in block diagram form in FIG. 2. The output of the speed sensor 82 representing the output speed $N_6$ of the drive is coupled to one input of a summing junction 100. The summing junction subtracts this signal from a reference signal $V_{ref}$ on a line 102 to develop an error signal on a line 104. This error signal is compensated by a gain and compensation circuit 106 to derive a phase advance command signal which is coupled to one input of a three-phase logic circuit 108. The three-phase logic circuit 108 develops three-phase switching signals from the phase advance signal, the signal representing rotor position from the position sensor 86 and a signal from a level detector 110. The level detector 110 senses the phase advance command signal and, when such signal is below a predetermined reference, develops a brake signal which causes the three-phase logic circuit 108 to develop signals which slow down the PMM2.

The signals from the three-phase logic circuit 108 are coupled to a set of switch drivers 112 which converts the signals from the circuit 108 to the levels required to properly operate the switches Q2-Q7, FIG. 2.

The current sensor 87a-87c develop signals representative of the current in the armature windings of the PMM2 which are coupled to a current level detector 116. When the current in one or more of the armature windings becomes excessive, the circuit 116 develops a high state signal which causes an inhibit circuit 118 to remove the base drive from the inverter switches Q2-Q7. The inhibit circuit 118 may also be responsive to other protective circuitry, such as the circuitry represented by the block 120 so that the switches Q2-Q7 are shut down or turned off when potentially damaging conditions exist. These conditions may include, for example, shoot-through caused by simultaneous conduction of series-connected switches, an over-voltage condition, an over-temperature condition or the like. In the event such an undesirable condition arises, a high state signal is generated on a line 122 which causes the inhibit circuit 118 and the switch drivers 112 to remove the base drive from the switches Q2-Q7.

The inhibit circuit 118 may also be responsive to an external shutdown signal which permits an operator to independently disable the inverter, if desired.

Figure 5:
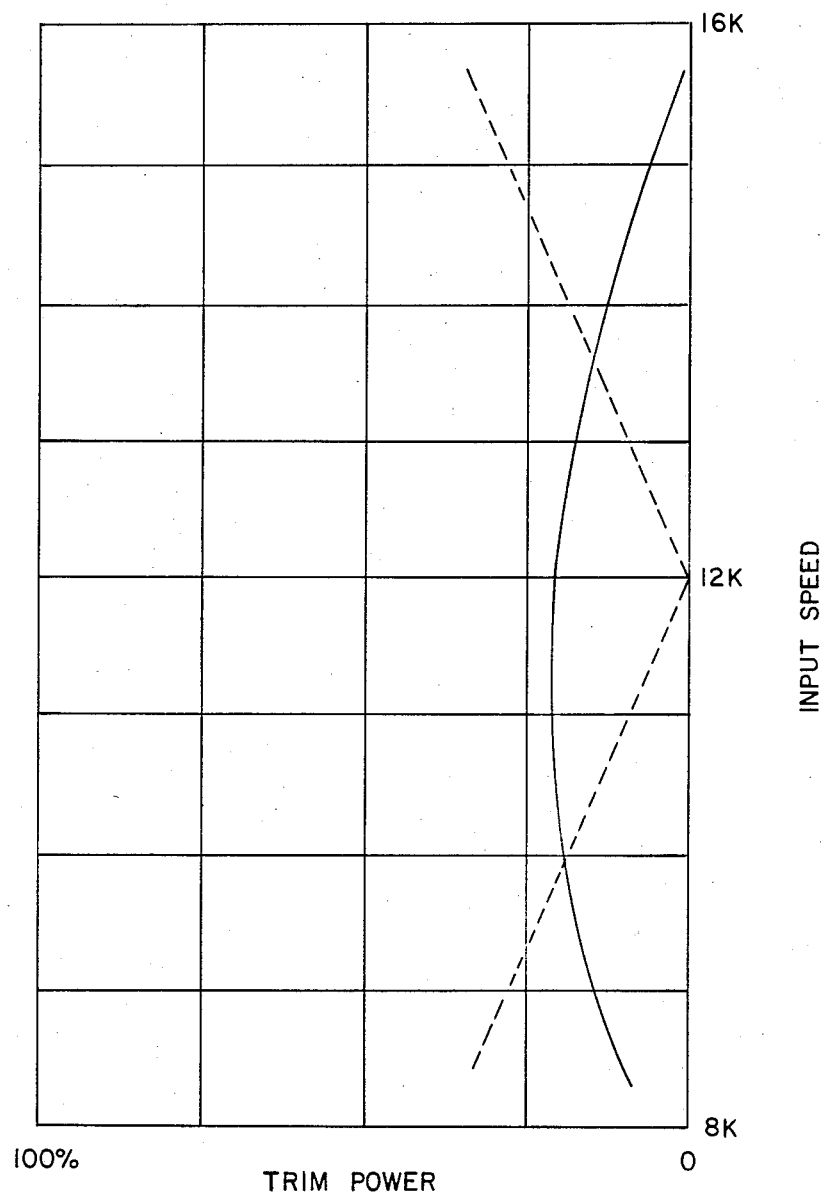
FIG. 5 is a graph illustrating the power handled by the permanent magnet machines illustrated in FIG. 1 and the power handled by the permanent magnet machines of the ECCSD disclosed in the above-referenced Dishner et al patent application.

Referring now to FIG. 5, the solid line graph illustrates the power handled in the trim loop of the present invention comprising the differentials 20,40, the permanent magnet machines PMM1,PMM2 and the power converter 70. The solid line graph is obtained by calculating the power at the inputs 30,50 of the differentials 20,40, adding the powers and dividing by two. Also shown in FIG. 5 in dotted line form is the power handled in the trim loop of the above-identified Dishner et al patent application. The dotted line graph is obtained by calculating the power at the differential input coupled to the speed-compensating permanent magnet machine. It can be seen that the power in the trim loop of the present invention is less at the extreme ends of the operating range than the power handled in the trim loop of the Dishner et al patent application. In fact, the power in the trim loop approaches zero at the extreme ends of the speed range. Further, the solid line power curve has a negative slope at speeds above a particular mid-range value, and hence trim power decreases with increasing prime mover speed in this operating range. This is contrasted with the positive slope of the dashed line power curve of the other drive. During normal operation of each drive in aircraft applications where the prime mover output speed is typically in the upper range of prime mover speed, the power handled in the trim loop of the drive of the present invention is less than the power handled in the trim loop of the above-referenced Dishner et al patent application. Since the efficiency of the drive is directly related to the magnitude of power handled in the trim loop, it can be seen that the drive of the present invention is more efficient than the drive disclosed in the Dishner et al patent application under normal operating conditions.

Also, the maximum control power in the trim loop of the present drive is significantly less (roughly half) than the maximum control power in the above-referenced Dishner et al patent application. Hence, the electrical power components in the trim loop may be designed for a lower power-handling capability.

Figure 6:
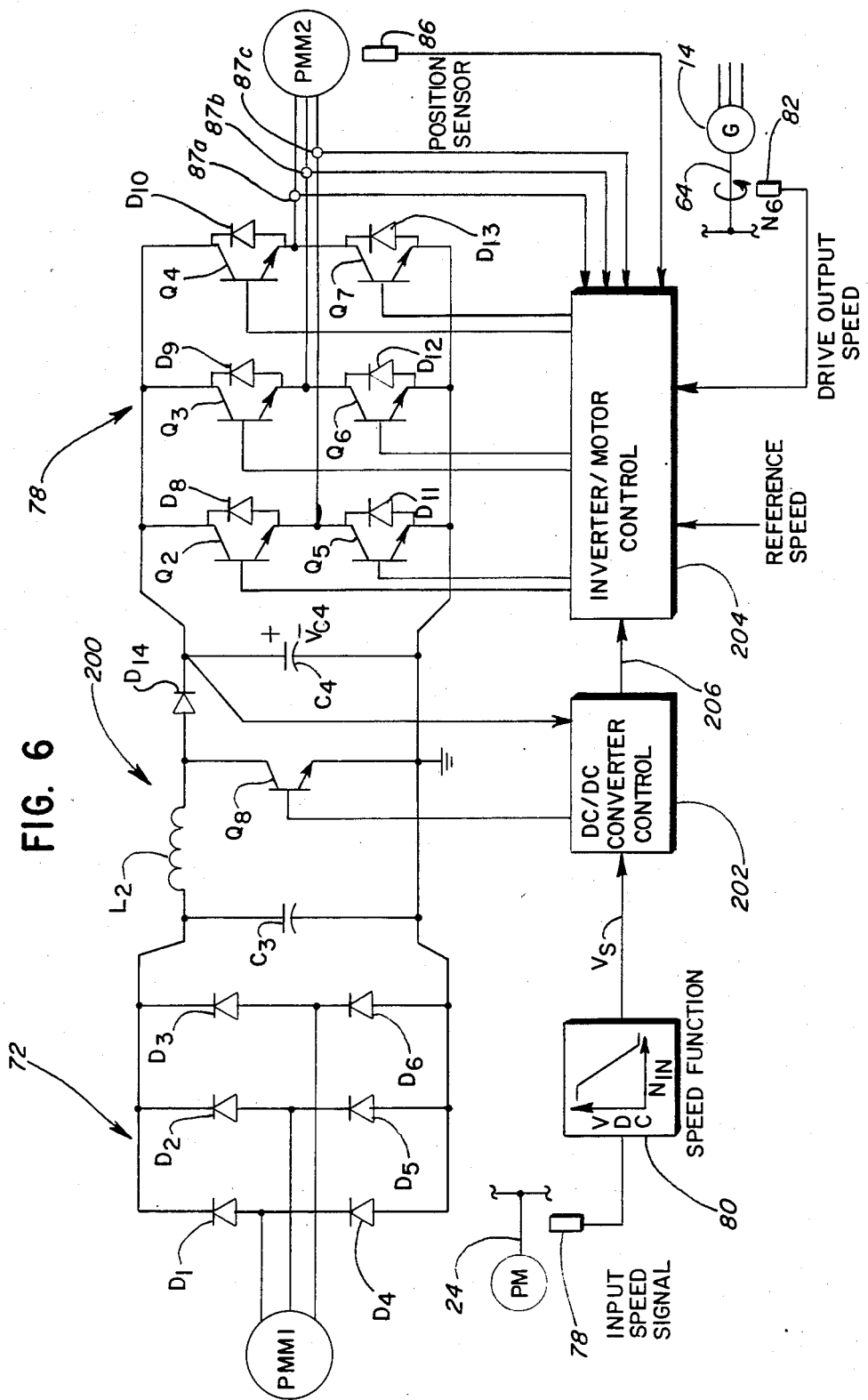
FIG. 6 is a combined schematic and block diagram of an alternative power converter which may be used in place of the power converter shown in FIG. 2.

Referring now to FIG. 6, there is illustrated a further type of power converter which may be used in place of the power converter 70 illustrated in FIG. 2. The converter utilizes the rectifier 72 and the full bridge inverter 78 shown in FIG. 2. However, these two circuits are interconnected by a boost DC/DC converter 200 which is operated by a converter control 202. In this embodiment, the DC/DC converter 200 only boosts or leaves unmodified the voltage developed by the rectifier 72. In the event the voltage develped by the rectifier 72 is greater than required to operate the PMM2 as a motor at the required speed, the switches $Q_2$–$Q_7$ in the inverter 78 are operated in a pulse-width modulated or PWM mode of operation by an inverter motor control 204. Since the DC/DC converter need only be a boost type of converter, its design can be simplified over that illustrated in FIG. 2.

More specifically, the voltage developed by the rectifier ciruit 72 is coupled across a capacitor $C_3$ which is in turn coupled to an inductor $L_2$ and a transistor $Q_8$. The transistor is operated by the converter control 202 to modulate the flow of power to an output capacitor $C_4$ through a diode $D_{14}$. The converter control 202 senses the voltage across the output capacitor $C_4$ and controls the switch $Q_8$ so that the proper voltage is delivered to the inverter 78. Further, when the voltage developed by the rectifier 72 is greater than that required by the inverter to operate the motor at the required speed, an analog error signal is developed on a line 206 which is delivered to the inverter motor control 204 so that the proper duty cycle for the switches is developed.

Figure 7:
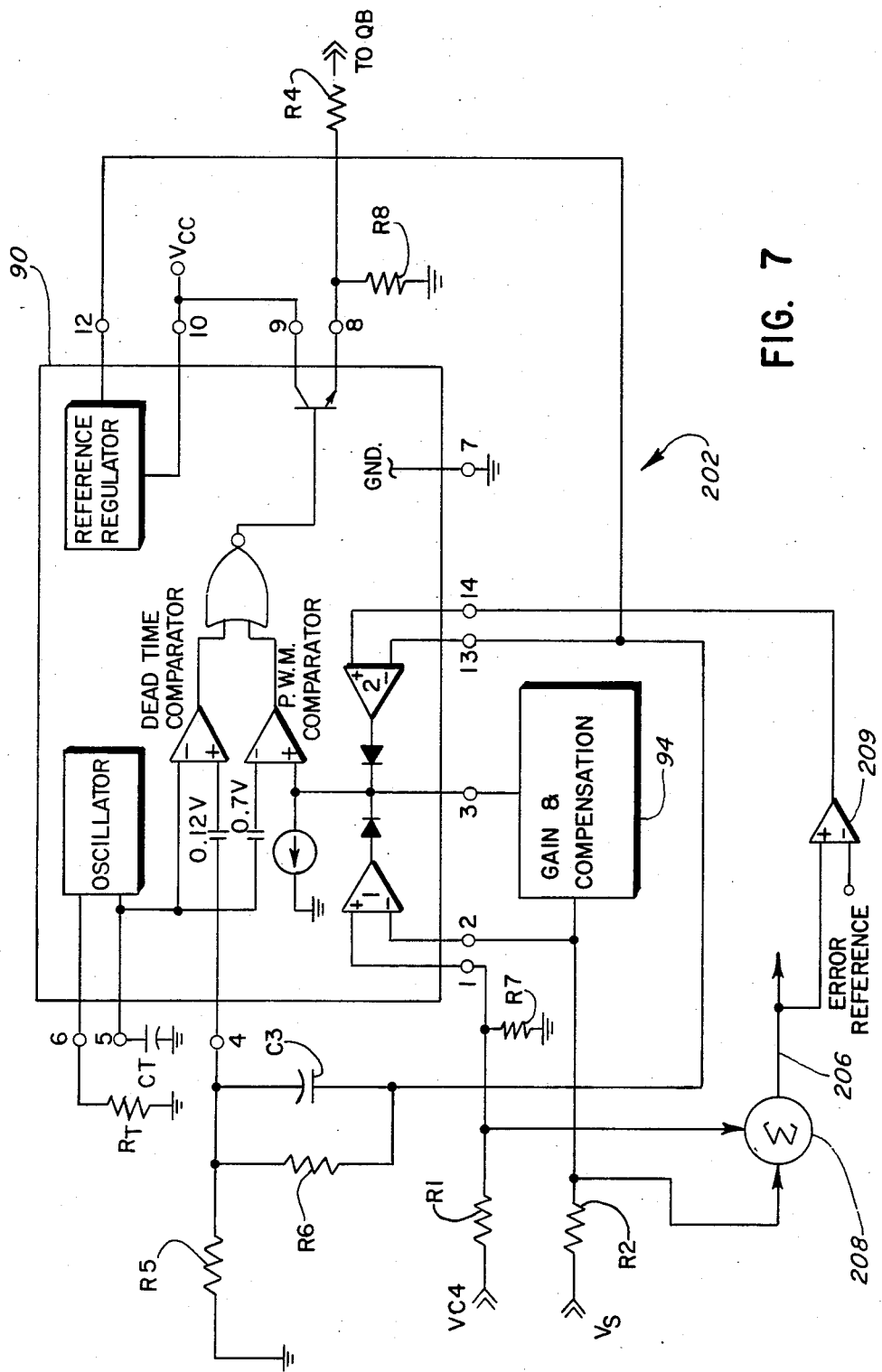
FIG. 7 is a combined schematic and block diagram of the DC/DC converter control circuit for operating the switch Q8 of the DC/DC converter shown in FIG. 6.

Referring now to FIG. 7, the DC/DC converter control 202 is quite similar to the converter control 76 illustrated in FIG. 3 and hence like elements are assigned like reference numerals and letters.

The signal $V_S$ from the speed function circuit 80 is coupled through the resistor R2 to pin 2 of the integrated circuit 90. The voltage $V_{C4}$ across the capacitor $C_4$ of the DC/DC converter 200 is coupled through the resistor R1 to pin 1 of the integrated circuit 90. A resistor R7 is coupled between the pin 1 and ground potential. The gain and compensation circuit 94 is again coupled between the pins 3 and 2 of the integrated circuit 90.

The switch $Q_8$ receives base drive signals from a pin 8 of the integrated circuit 90 via the resistor R4. The pin 8 is also coupled to ground potential through a resistor R8. The pin 9 which was coupled to the resistor R4 in the embodiment of FIG. 3 is instead coupled to a voltage $V_{CC}$, as is a pin 10.

The analog error signal on the line 206 is developed by a summing junction 208 which substracts the signals coupled to the pins 1 and 2 of the IC 90 to derive a signal representing the deviation of the voltage $V_S$ from the voltage $V_{C4}$. The error signal on the line 206 is coupled to a comparator 209 which compares the error signal against a reference. When the error signal on the line 206 becomes significant (i.e. greater than the reference), it has been determined that the converter 200 is no longer controlling the voltage applied to the PMM2. At this time the comparator 209 develops a high state signal which is coupled to a pin 14 of the IC 90 to disable the switch $Q_8$.

Figure 8:
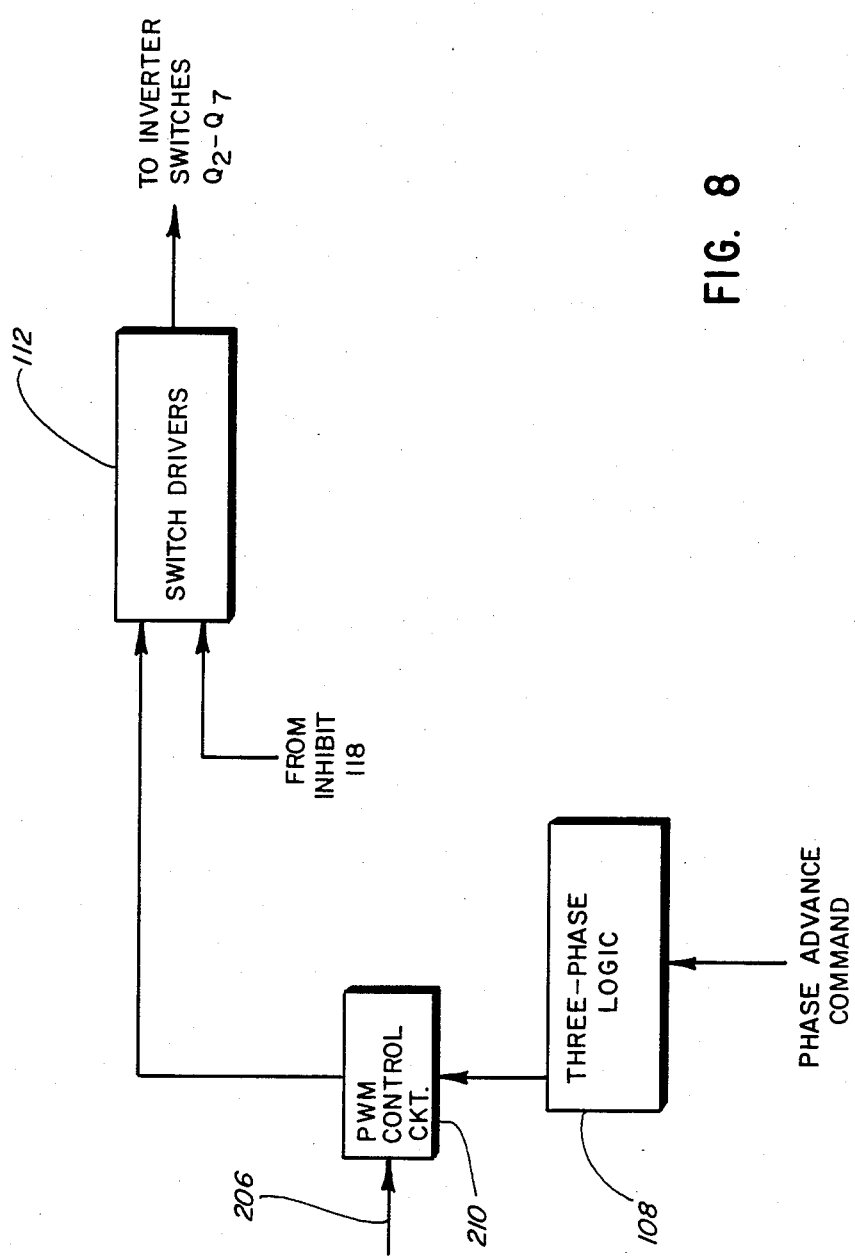
FIG. 8 is a block diagram illustrating modifications to the block diagram of FIG. 4 for operating the switches Q2–Q7 when the circuits of FIGS. 6 and 7 are used.

The inverter motor control 204 is identical to that shown in FIG. 4 except as modified by the circuitry shown in FIG. 8. A PWM control circuit 210 is coupled between the three-phase logic circuit 108 and the switch driver circuit 112 and is responsive to the error signal on the line 206 to operate the switches $Q_2$–$Q_7$ in a pulse width modulated mode when the voltage $V_{C4}$ is greater than the back emf of the machine PMM2, i.e. when the voltage $V_{C4}$ is greater than that required to operate PMM2 at the appropriate speed magnitude.

We claim:

1. A constant speed drive for developing constant speed motive power from variable speed motive power developed by a prime mover, comprising:

first and second differentials each having first and second inputs and an output, the differential outputs being coupled together and producing the constant speed motive power, the first input of the first and second differentials being coupled through gear sets to the output of the prime mover whereby the first input of the first differential is driven at a speed greater than a desired output speed of the drive and the first input of the second differential is driven at a speed less than the desired output speed;

a first permanent magnet machine coupled to the second input of the first differential, the first permanent magnet machine being driven as a generator to develop alternating current power at power windings thereof;

a second permanent magnet machine having a motive power shaft coupled to the second input of the second differential, the second permanent magnet machine including electrical power windings; and a power converter interconnecting the power windings of the first and second permanent magnet machines for operating the second permanent magnet machine as a motor to develop compensating speed of appropriate magnitude and direction to cause the output of the second differential to develop motive power at the desired speed.

2. The constant speed drive of claim 1, wherein the power converter includes a rectifier coupled to the power windings of the first permanent magnet machine, a DC/DC converter coupled to the rectifier and an inverter coupled between the DC/DC converter and the power windings of the second permanent magnet machine.

3. The constant speed drive of claim 2, wherein the DC/DC converter comprises a buck/boost converter.

4. The constant speed drive of claim 2, wherein the DC/DC converter comprises a boost converter.

5. The constant speed drive of claim 4, wherein the power converter further includes means for controlling the inverter in a pulse-width modulated mode of operation when the voltage developed at the output of the rectifier is greater than that required to operate the second permanent magnet machine at the appropriate speed magnitude.

6. The constant speed drive of claim 2, wherein the DC/DC converter includes a power switch operated by a converter control.

7. The constant speed drive of claim 6, wherein the converter control comprises a pulse-width modulator.

8. A constant speed drive for developing constant speed motive power from variable speed motive power developed by a prime mover, comprising:
   first and second differentials each having first and second inputs and an output, the differential outputs being coupled together and producing the constant speed motive power, the first input of the first and second differentials being coupled through gear sets to the output of the prime mover whereby the first input of the first differential is driven at a speed greater than a desired output speed of the drive and the first input of the second differential is driven at a speed less than the desired output speed;
   a first permanent magnet machine having a motive power shaft coupled to the second input of the first differential, the first permanent magnet machine being driven as a generator to develop alternating current power at power windings thereof;
   a second permanent magnet machine having a motive power shaft coupled to the second input of the second differential, the second permanent magnet machine including electrical power windings;
   a rectifier circuit connected to the power windings of the first permanent magnet machine for rectifying the power developed by such machine to derive intermediate DC power;
   a DC/DC converter coupled to the rectifier circuit;
   an inverter coupled between the DC/DC converter and the power windings of the second permanent magnet machine; and
   means for controlling the DC/DC converter and the inverter so that the second permanent magnet machine develops compensating speed of appropriate magnitude to cause the output of the second differential to develop motive power at the desired speed.

9. The constant speed drive of claim 8, wherein the DC/DC converter comprises a buck/boost converter.

10. The constant speed drive of claim 8, wherein the DC/DC converter comprises a boost converter.

11. The constant speed drive of claim 10, wherein the second permanent magnet machine develops a back emf and wherein the controlling means includes a pulse-width modulator for operating the inverter in a pulse-width modulated mode of operation when the voltage developed at the output of the rectifier is greater than the back emf developed by the second permanent magnet machine.

12. The constant speed drive of claim 8, wherein the DC/DC converter includes a power switch operated by the controlling means.

13. The constant speed drive of claim 12, wherein the controlling means includes a pulse-width modulator coupled to the power switch of the DC/DC converter.

* * * * *